(12) United States Patent
Skalicky et al.

(10) Patent No.: US 10,495,761 B2
(45) Date of Patent: Dec. 3, 2019

(54) SMART SATELLITE DISTRIBUTION INTO ARAIM CLUSTERS FOR USE IN MONITORING INTEGRITY OF COMPUTED NAVIGATION SOLUTIONS

(71) Applicant: Honeywell International Inc., Morris Plains, NJ (US)

(72) Inventors: Jakub Skalicky, Brno (CZ); Jussi Raasakka, Brno (CZ); Martin Orejas, Brno (CZ); Ondrej Kutik, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 670 days.

(21) Appl. No.: 15/221,399

(22) Filed: Jul. 27, 2016

(65) Prior Publication Data
US 2017/0139052 A1    May 18, 2017

Related U.S. Application Data

(60) Provisional application No. 62/254,873, filed on Nov. 13, 2015.

(51) Int. Cl.
*G01S 19/28* (2010.01)
*G01S 19/20* (2010.01)

(52) U.S. Cl.
CPC .............. *G01S 19/28* (2013.01); *G01S 19/20* (2013.01)

(58) Field of Classification Search
CPC ................................ G01S 19/28; G01S 19/20
(Continued)

(56) References Cited

U.S. PATENT DOCUMENTS 5,760,737 A * 6/1998 Brenner ............... G01C 21/165
                                                             342/357.58
6,639,549 B2 * 10/2003 Vanderwerf ........... G01S 19/20
                                                             342/357.58
(Continued)

FOREIGN PATENT DOCUMENTS

CA         2923263 A1      9/2016
CN         101520503       7/2011
(Continued)

OTHER PUBLICATIONS

Satellite Selection Methodology for Horizontal Navigation and Integrity Algorithms Gerbeth et al; German Aerospace Center; Conference Paper • Sep. 2016; pp. 1-10 https://core.ac.uk/download/pdf/77230704.pdf.*
(Continued)

*Primary Examiner* — Chuong P Nguyen
(74) *Attorney, Agent, or Firm* — Fogg & Powers LLC

(57) ABSTRACT

A global navigation satellite system (GNSS) receiver including a processing device configured to: group GNSS satellites in view of the GNSS receiver into subsets based on relative geometries of the GNSS satellites relative to the GNSS receiver, wherein a GNSS satellite of the GNSS satellites is included in at most one subset of the subsets, wherein each subset of the subsets includes at least one GNSS satellite of the GNSS satellites and less than all GNSS satellites of the GNSS satellites, and wherein at least one subset includes more than one GNSS satellite; calculate a plurality of navigation sub-solutions based on data received at the GNSS receiver from the GNSS satellites using at least one GNSS antenna, wherein each navigation sub-solution of the navigation sub-solutions is calculated with at least one different subset of the subsets excluded; and calculate a protection level based on the navigation sub-solutions.

17 Claims, 5 Drawing Sheets

(58) Field of Classification Search
USPC .......................................... 342/357.67, 357.58
See application file for complete search history.

(56) References Cited

U.S. PATENT DOCUMENTS

| | | | |
|---|---|---|---|
| 8,014,948 B2 * | 9/2011 | Vanderwerf | G01S 19/20 342/357.59 |
| 8,085,196 B2 | 12/2011 | Whitehead | |
| 8,094,069 B2 | 1/2012 | Rang et al. | |
| 8,106,823 B2 | 1/2012 | Schroth | |
| 8,193,976 B2 | 6/2012 | Shen et al. | |
| 8,659,474 B2 | 2/2014 | Dai et al. | |
| 8,717,234 B2 | 5/2014 | Laine | |
| 8,976,064 B2 * | 3/2015 | Brenner | G01S 19/07 342/357.24 |
| 9,086,479 B2 * | 7/2015 | Pratt | G01S 19/42 |
| 9,146,320 B2 * | 9/2015 | Najim | G01S 19/20 |
| 9,158,002 B2 * | 10/2015 | Pratt | G01S 19/28 |
| 9,244,172 B2 | 1/2016 | O'Connor et al. | |
| 9,285,479 B2 * | 3/2016 | O'Connor | G01S 19/42 |
| 9,411,051 B2 | 8/2016 | Sagiraju et al. | |
| 9,476,985 B2 * | 10/2016 | Scheitlin | G01S 19/08 |
| 9,488,734 B2 | 11/2016 | Davain | |
| 9,547,086 B2 * | 1/2017 | Dunik | G01S 19/20 |
| 9,720,091 B2 * | 8/2017 | Skalicky | G01S 19/13 |
| 9,885,788 B2 * | 2/2018 | Skalicky | G01S 19/28 |
| 10,018,729 B2 * | 7/2018 | Dunik | G01S 19/20 |
| 2003/0231132 A1 | 12/2003 | Park | |
| 2008/0186229 A1 | 8/2008 | Van Diggelen et al. | |
| 2013/0002480 A1 * | 1/2013 | Pratt | G01S 19/28 342/357.25 |
| 2013/0021198 A1 * | 1/2013 | Pratt | G01S 19/28 342/357.25 |
| 2014/0232595 A1 | 8/2014 | Rife | |
| 2014/0240171 A1 | 8/2014 | Cho et al. | |
| 2015/0145719 A1 | 5/2015 | Dunik et al. | |
| 2015/0145724 A1 * | 5/2015 | Kana | G01S 19/421 342/357.58 |
| 2016/0061956 A1 * | 3/2016 | Savoy, Jr. | G01S 19/03 342/357.4 |
| 2016/0178752 A1 * | 6/2016 | Davies | G01S 19/20 342/357.58 |
| 2016/0216378 A1 | 7/2016 | Davain | |
| 2016/0274242 A1 | 9/2016 | Skalicky et al. | |
| 2017/0146663 A1 * | 5/2017 | Skalicky | G01S 19/20 |
| 2018/0081064 A1 * | 3/2018 | Skalicky | G01S 19/20 |

FOREIGN PATENT DOCUMENTS

| | | |
|---|---|---|
| CN | 102540213 | 10/2013 |
| CN | 103592658 | 2/2014 |

OTHER PUBLICATIONS

Reduced Subset Analysis for Multi-Constellation ARAIM Walter et al; Stanford University; Jan. 2014; pp. 1-10 https://pdfs.semanticscholar.org/d555/a1a6f7165d315d92cad8c0f8166fb6363f95.pdf.*

European Patent Office, "Communication under Rule 71(3) EPC from EP Application No. 16158851.2 dated Jan. 9, 2017", "from Foreign Counterpart of U.S. Appl. No. 14/658,372", dated Jan. 9, 2017, pp. 1-29, Published in: EP.

United States Patent and Trademark Office, "Notice of Allowance", "From U.S. Appl. No. 14/658,372", dated Sep. 27, 2017, pp. 1-28, Published in: US.

U.S. Patent and Trademark Office, "Supplemental Notice of Allowability", "U.S. Appl. No. 14/658,372", dated Oct. 17, 2017, pp. 1-5, Published in: US.

U.S. Patent and Trademark Office, "Office Action", "U.S. Appl. No. 14/658,372", dated Mar. 15, 2017, pp. 1-28.

European Patent Office, "Extended European Search Report from EP Application No. 16196671.8 dated Apr. 19, 2017", "from Foreign Counterpart of U.S. Appl. No. 15/221,399", dated Apr. 19, 2017, pp. 1-9, Published in: EP.

Orejas et al., "Implementation and Testing of Clustered ARAIM in a GPS/Galileo Receiver | Technical Program ION", "Retrieved Aug. 25, 2016 from https://www.ion.org/gnss/abstracts.cfm?paperID=4426", Sep. 14, 2016, pp. 1-4, Publisher: Institute of Navigation.

Orejas et al., "Clustered ARAIM", "Proceedings of the 2016 International Technical Meeting", Jan. 25-28, 2016, pp. 224-230, Publisher: ION ITM 2016, Published in: US.

Orejas et al., "Implementation and Testing of Clustered ARAIM in a GPS/Galileo Receiver", "Proceedings of the 29th International Technical Meeting of the ION Satellite Division", Sep. 12-16, 2016, pp. 1360-1367, Publisher: ION GNSS+ 2016, Published in: US.

Schroth et al., "Enhancements of the Range Consensus Algorithm (RANCO)", "GNSS 2008—Proceedings of the 21st International Technical Meeting of the Satellite Division of the Institute of Navigation", Sep. 19, 2008, pp. 93-103, Publisher: The Institute of Navigation, Published in: Manassas, VA.

Blanch et al, "Baseline Advanced RAIM User Algorithm and Possible Improvements", IEEE Transactions on Aerospace and Electronic Systems, Dated Jan. 2015, pp. 1-20, vol. 51, No. 1, Publisher: IEEE.

European Patent Office, "Extended European Search Report for EP Application No. 17191493.0", "Foreign counterpart to U.S. Appl. No. 15/599,455", dated Mar. 5, 2018, pp. 1-11, Published in: EP.

Orejas et al, "Multiconstellation GNSS/INS to Support LPV200 Approaches and Autoloading", "25th International Technical Meeting of the Satellite Division of the Institute of Navigation, Nashville, TN", Dated Sep. 17-21, 2012, pp. 790-803.

European Patent Office, "Extended European Search Report from EP Application No. 16158851.2 dated Jul. 5, 2016", "from Foreign Counterpart of U.S. Appl. No. 14/658,372", dated Jul. 5, 2016, pp. 1-7, Published in: EP.

Blanch et al., "Advanced RAIM User Algorithm Description: Integrity Support Message Processing, Fault Detection, Exclusion, and Protection Level Calculation", "Proceedings of the 25th International Technical Meeting of the Satellite Division of the Institute of Navigation", Dec. 2013, pp. 1-23, Publisher: ION GNSS 2012, Published in: Nashville, TN.

Castaldo et al., "P-RANSAC: An Integrity Monitoring Approach for GNSS Signal Degraded Scenario", "International Journal of Navigation and Observation", Sep. 24, 2014, pp. 1-12, vol. 2014, Publisher: Hindawi Publishing Corporation.

Kana et al., "Architectures for High Integrity Multi-Constellation Solution Separation", "Proceedings of the 27th International Technical Meeting of the ION Satellite Division, ION GNSS+ 2014, Sep. 8-12, 2014", Sep. 2014, pp. 3554-3565.

Lee, "Investigation of Extending Receiver Autonomous integrity Monitoring (RAIM) to Combined Use of Galileo and Modernized GPS", "ION GNSS 17th International Technical Meeting of the Satellite Division, Sep. 21-24, 2004", Sep. 2004, pp. 1691-1698, Published in: Long Beach, CA.

Lee, "New Advanced RAIM with Improved Availability for Detecting Constellation-wide Faults, Using Two Independent Constellations", "Journal of the Institute of Navigation", Mar. 2014, pp. 71-83, vol. 60, No. 1, Publisher: Institute of Navigation.

Liu et al., "A Recursive Quasi-optimal Fast Satellite Selection Method for GNSS Receivers", Nov. 2009, pp. 1-11, Publisher: School of Information and Electronics, Beijing Institute of Technology.

Miaoyan et al., "Satellite Selection for Multi-Constellation", Apr. 2008, pp. 1053-1059, Publisher: IEEE.

Rippl, "Real Time Advance Receiver Autonomous Integrity Monitoring in DLR's Multi-Antenna GNSS Receiver", "International Technical Meeting (ITM) of the Institute of Navigation", Jan. 30-Feb. 1, 2012, pp. 1767-1776, Published in: Newport Beach, CA.

Roongpiboonsopit et al., "A Multi-Constellations Satellite Selection Algorithm for Integrated Global Navigation Satellite Systems", "Retrived on Dec. 21, 2015 from web address http://dx.doi.org/10.1080/15472450903084238", Mar. 10, 2009, pp. 1-16.

Simon et al., "Advanced RAIM scheme and its evaluation for non-aeronautical users in different environments", "23rd International Technical Meeting of the Satellite Division of the Institute of Navigation, Sep. 21-24, 2010", Sep. 2010, pp. 292-300, Published in: Portland, OR.

(56) References Cited

OTHER PUBLICATIONS

Su et al., "Receiver Autonomous Integrity Monitoring Availability and Fault Detection Capability Comparison Between BeiDou and GPS", May 5, 2013, pp. 313-324.
Tu et al., "Evaluation of GNSS Receiver Autonomous Integrity Monitoring for Multiple Outliers With a Smart Random Sample Consensus Strategy", "Geoinformatics 2011, 19th International Conference", Jul. 2011, pp. 1-6, Publisher: IEEE, Published in: US.
Walter et al., "Reduced Subset Analysis for Multi-Constellation ARAIM", "Institute of Navigation (ION) International Technical Meeting", Feb. 2014, pp. 1-10.
Zhang et al., "A Fast Satellite Selection Algorithm: Beyond Four Satellites", Oct. 2009, pp. 740-747, vol. 3, No. 5, Publisher: ISSS Journal of Selected Topics in Signal Processing.
Zhang et al., "Enhancements of the Satellite Selection Method for Multi-Constellation GNSS Using Convex Geometry", "Radar Conference 2013", Apr. 14, 2013, pp. 1-8, Publisher: IET International.
U.S. Patent and Trademark Office, "Office Action", U.S. Appl. No. 15/599,445, dated Jun. 14, 2019, pp. 1-43, Published: US.

\* cited by examiner

SMART SATELLITE DISTRIBUTION INTO ARAIM CLUSTERS FOR USE IN MONITORING INTEGRITY OF COMPUTED NAVIGATION SOLUTIONS

CROSS-REFERENCE TO RELATED APPLICATIONS

This application claims the benefit of U.S. Provisional Patent Application Ser. No. 62/254,873 filed on Nov. 13, 2015, which is hereby incorporated herein by reference.

This application is related to U.S. patent application Ser. No. 14/658,372 entitled "SATELLITE SUBSET SELECTION FOR USE IN MONITORING THE INTEGRITY OF COMPUTED NAVIGATION SOLUTIONS" filed on Mar. 16, 2015 (hereinafter the '372 application), which is hereby incorporated herein by reference.

BACKGROUND

Several Global Navigation Satellite System (GNSS) applications, such as safety critical applications, require that a GNSS receiver monitor the integrity of the GNSS receiver's computed solution. The integrity of a computed solution is the level of trust that can be placed in the correctness of the computed solution. Monitoring the integrity of a computed solution protects users from position errors that arise from bad geometries, satellite faults, etc. that are not yet identified by the system ground monitoring network.

Current integrity monitoring schemes, such as Receiver Autonomous Integrity Monitoring (RAIM), determine whether there is a fault in a satellite measurement by examining the consistency of a set of redundant measurements. One way to do this is by using the solution separation method. The solution separation method for RAIM is based on computing the difference between a "full-solution" navigation solution that is rendered using all visible satellites (including a quantity of N visible satellites) and a set of navigation "sub-solutions" that are each rendered using a quantity of N–1 visible satellites. In computing the set of navigation sub-solutions, RAIM assumes only one satellite fault at a time. However, with the introduction of new Global Navigation Satellite System (GNSS) constellations (such as Galileo, BeiDou, etc.) and the continuing use of existing GNSS constellations (such as Global Positioning System (GPS), GLONASS, etc.), it is more likely that there could be multiple simultaneous satellite faults at a given time. Furthermore, entire constellation faults will also need to be considered by future integrity monitoring schemes.

In response to the likelihood of more than one fault occurring at the same time, Advanced Receiver Autonomous Integrity Monitoring (ARAIM) was developed. ARAIM is based on the solution separation method but it was modified to include multiple faults and constellation faults. For each fault that needs to be monitored, a navigation sub-solution that does not include the fault-associated measurements is created. For example, if dual faults (two simultaneous single faults) need to be monitored then a set of sub-solutions based on removing all possible combinations of 2 satellites needs to be created. Increasing the number of visible satellites and higher probabilities of simultaneous faults (as expected from new constellations), however, can dramatically increase the number of sub-solutions that need to be created. This, in turn, will have a large impact on the computational demands of the algorithm resulting in more expensive chips.

SUMMARY

A global navigation satellite system (GNSS) receiver including a processing device configured to: group a plurality of GNSS satellites in view of the GNSS receiver into a plurality of subsets based on relative geometries of the plurality of GNSS satellites relative to the GNSS receiver, wherein a GNSS satellite of the plurality of GNSS satellites is included in at most one subset of the plurality of subsets, wherein each subset of the plurality of subsets includes at least one GNSS satellite of the plurality of GNSS satellites and less than all GNSS satellites of the plurality of GNSS satellites, and wherein at least one subset includes more than one GNSS satellite; calculate a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded; and calculate a protection level based on the plurality of navigation sub-solutions.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
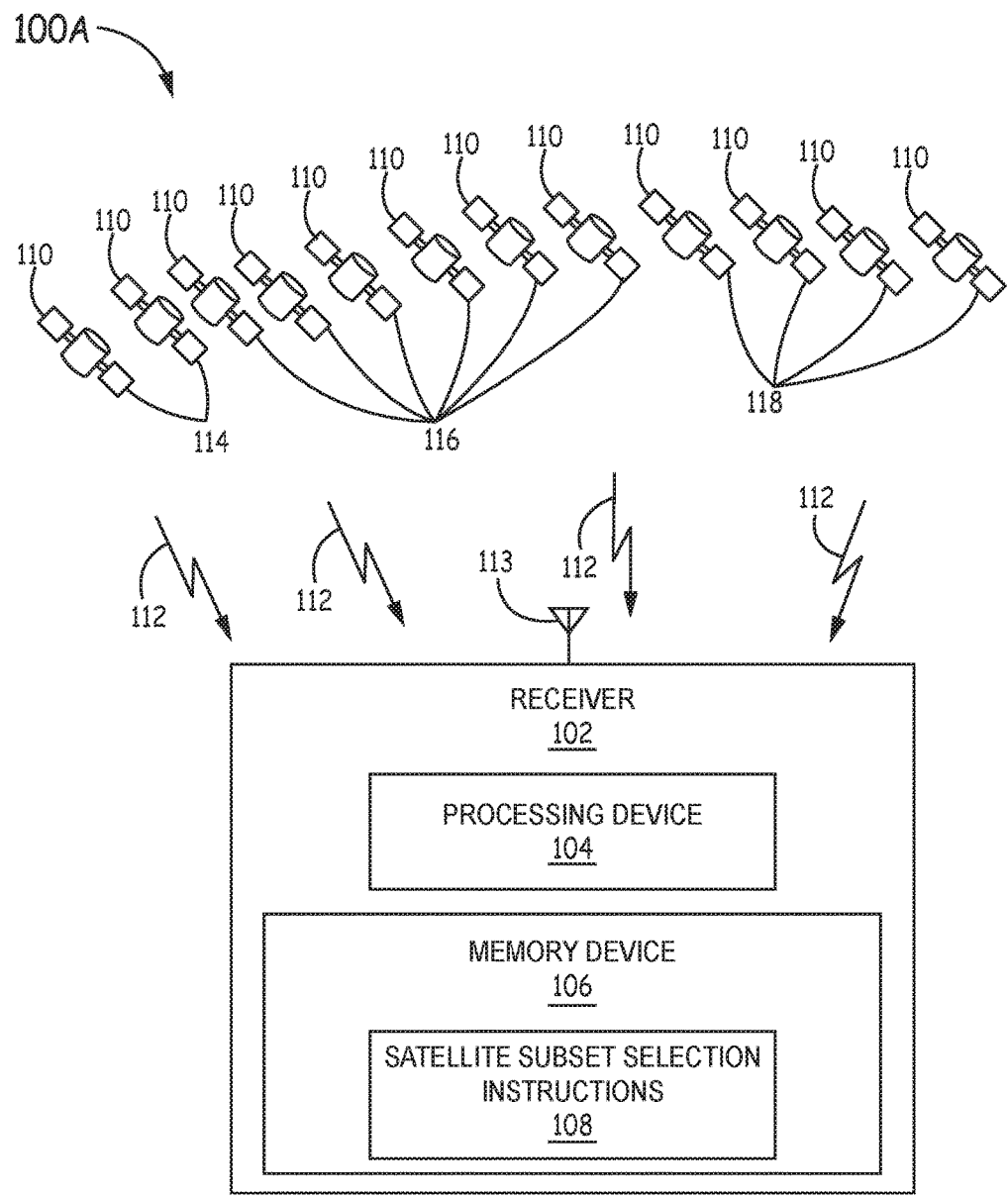
FIGS. 1A-1C are block diagrams of example systems for satellite subset selection for use in monitoring the integrity of computed navigation solutions.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

While users within the coverage of GNSS augmentation systems (such as Wide Area Augmentation System (WAAS), European Geostationary Navigation Overlay Service (EGNOS), Quasi-Zenith Satellite System (QZSS), and/or GPS Aided Geo Augmented Navigation (GAGAN)) can rely on the augmentation system to provide the integrity, users elsewhere need to check GNSS solutions' consistency in order to guarantee a certain level of integrity. With the advent of new GNSS constellations (such as Galileo, BeiDou, etc.), future GNSS receivers will need to enhance their protection schemes to include the new GNSS satellites from the new GNSS constellations. Previously, only one fault at a time was assumed. With significantly more GNSS satellites being available to the GNSS receiver, the assumption of only one fault at a time may no longer be a valid assumption. Moreover, the GNSS receiver will need to protect the user from GNSS constellation-wide failures. To address these issues, the Advanced Receiver Autonomous Integrity Monitoring (ARAIM) algorithm was developed. However, in order to protect against multiple simultaneous faults, the number of position solutions ARAIM needs to compute rises enormously. Accordingly, ARAIM requires significantly higher computational effort than other integrity monitoring methodologies. The significantly higher computation effort can cause ARAIM to be impractical in some applications.

Previous research was mainly focused on performance and safety of the ARAIM algorithm. For receiver manufacturers, an important aspect is also the computational efficiency of the ARAIM. Having more GNSS satellites and constellations available in general increases the provided integrity, but it also increases the number of fault modes that need to be monitored. This has a direct impact on the number of sub-solutions that have to be created and thus on the computational demands of the ARAIM. Furthermore, new, constellations (such as Galileo, BeiDou, etc.) may require higher a priori probability of fault, at least until enough data characterizing their performance is available, leading to an increased probability of simultaneous faults. For certain scenarios, depending on the number of constellations and satellites in view and their associated probabilities of fault, the ARAIM algorithm may need to compute a hundred or more sub-solutions. The high computational demands of the algorithm may render it impractical for aviation applications.

Solutions to this problem were the subject of the '372 application which described dividing each GNSS constellation into several clusters to reduce the computational load to a fraction of the original value. This enables reduction in the number of sub-solutions in a flexible way, independent of the actual number of satellites. The complexity of the computation is greatly reduced while maintaining acceptable performance in terms of protection levels. This is achieved by creating sub-solutions that cover several fault modes at the time, reducing the total number of sub-solutions to be assessed. The reduction in the computational complexity allows the methodology to be applied to computationally lower power hardware. Poor distribution of the available GNSS satellites into the clusters can adversely affect the performance of the ARAIM algorithm, in particular the computed protection levels. In exemplary embodiments, the worst possible cluster distributions lead to several orders of magnitude larger protection levels while the best, or optimal, cluster distribution outperforms the baseline ARAIM. Accordingly, there was a need for improved systems and methods for minimizing the impact of GNSS satellite disruptions on the outputs of the ARAIM.

There was a need in the art for improved systems and methods for considering the possibility of multiple GNSS satellite faults and entire GNSS constellation faults at the same time, while reducing the computational load for processors for considering these possibilities. The method chosen to mitigate the large computational demands of the ARAIM algorithm consists in splitting the respective GNSS constellations into several groups/subsets/clusters of GNSS satellites and then performing the exclusion of the satellites for solution separation at a group/subset/cluster of GNSS satellites level, rather than at an individual GNSS satellite level. The GNSS satellite clusters can then be used to cover many possible fault modes at once, thus lowering the number of computed sub-solutions of GNSS satellites and therefore total necessary throughput. However, the manner in which the GNSS satellites are distributed into respective GNSS satellite groups/subsets/clusters affects the ARAIM performance. In terms of the protection level, the difference in performance can amount to tens of percent points. In exemplary embodiments, a sub-solution removing both clusters from the same constellation completely removes that constellation and protects the GNSS receiver from constellation-wide faults. These two fault modes are merged and their a priori probability of occurrence is added together.

As described above, ARAIM takes into consideration multiple simultaneous faults. However, the computational load for a processor for considering these multiple simultaneous faults is demanding. For example, if there are 40 satellites in view of a multi-constellation receiver, which is a reasonable scenario with four constellations in use, and up to three faults are to be considered, there are $_{40}C_{39}+_{40}C_{38}+_{40}C_{37}=10,700$ sub-solutions that need to be computed by the ARAIM algorithm. The embodiments disclosed herein reduce the number of sub-solutions that are computed by grouping the satellites into a plurality of subsets. For example, assume there are a total of 40 satellites in view of a GNSS receiver, wherein the 40 satellites include satellites from four constellations, ten satellites from each constellation. In one exemplary embodiment, the 40 visible satellites can be grouped into eight subsets with five satellites in each subset. Now, if up to three faults were considered, there would be $_{8}C_{7}+_{8}C_{6}+_{8}C_{5}=92$ sub-solutions that need to be computed, thereby dramatically reducing the computational load for a processor. As can be seen from this exemplary embodiment and other exemplary embodiments discussed below, this method results in a fixed number of subsets that are computed. As a result, the Worst Case Execution Time (WCET), which is crucial for safety critical applications, is easier to determine. Furthermore, increasing the number of visible satellites would have a limited impact in the WCET.

The ideal distribution of GNSS satellite clusters that minimizes the protection levels can be found by extensive brute force search and often produces lower protection levels than the baseline, "un-clustered" ARAIM (its value referred to as a "nominal protection level"). By improving the geometry of each individual GNSS satellite group/subset/cluster (in particular the GNSS satellite cluster with the worst geometry), the computed protection levels are lowered. Several exemplary computationally efficient algorithms are described below to split the GNSS satellites among respective GNSS satellite clusters such that the resultant protection level is close to ideal. There are several possible methodologies in which the GNSS satellites can more effectively be distributed into GNSS satellite clusters. In exemplary embodiments, the relative geometry of the GNSS satellites with respect to the GNSS receiver (where the user is positioned) are used in the determination of how to split the GNSS satellites among the respective GNSS satellite groups/subsets/clusters. In exemplary embodiments, information about the GNSS satellites' elevation and azimuth are used in the determination of how to split the GNSS satellites among the respective GNSS satellite groups/subsets/clusters. In exemplary embodiments, the positions of the GNSS receiver (where the user is positioned) and the GNSS satellites are used in the determination of how to split the GNSS satellites among the respective GNSS satellite groups/subsets/clusters. In exemplary embodiments, the relative distances among the GNSS satellites and/or between the GNSS receiver (where the user is positioned) and the GNSS satellites, are used in the determination of how to split the GNSS satellites among the respective GNSS satellite groups/subsets/clusters. In exemplary embodiments, a covariance matrix of the created clusters is used in the determination of how to split the GNSS satellites among the respective GNSS satellite clusters. In exemplary embodiments, covariance matrices of the created highest-order sub-solution are used in the determination of how to split the GNSS satellites among the respective GNSS satellite clusters. In exemplary embodiments, this enables the geometry of the sub-solutions after the clusters are excluded to be improved. These methodologies are described in more detail below. Each of these methods uses information about satellites' elevation and azimuth, the position of the user's GNSS receiver and the satellites, and/or the relative distances between the user and the GNSS satellites. In other words, the selection process is based on the relative geometry of the satellites with respect to the user.

Figure 1B:
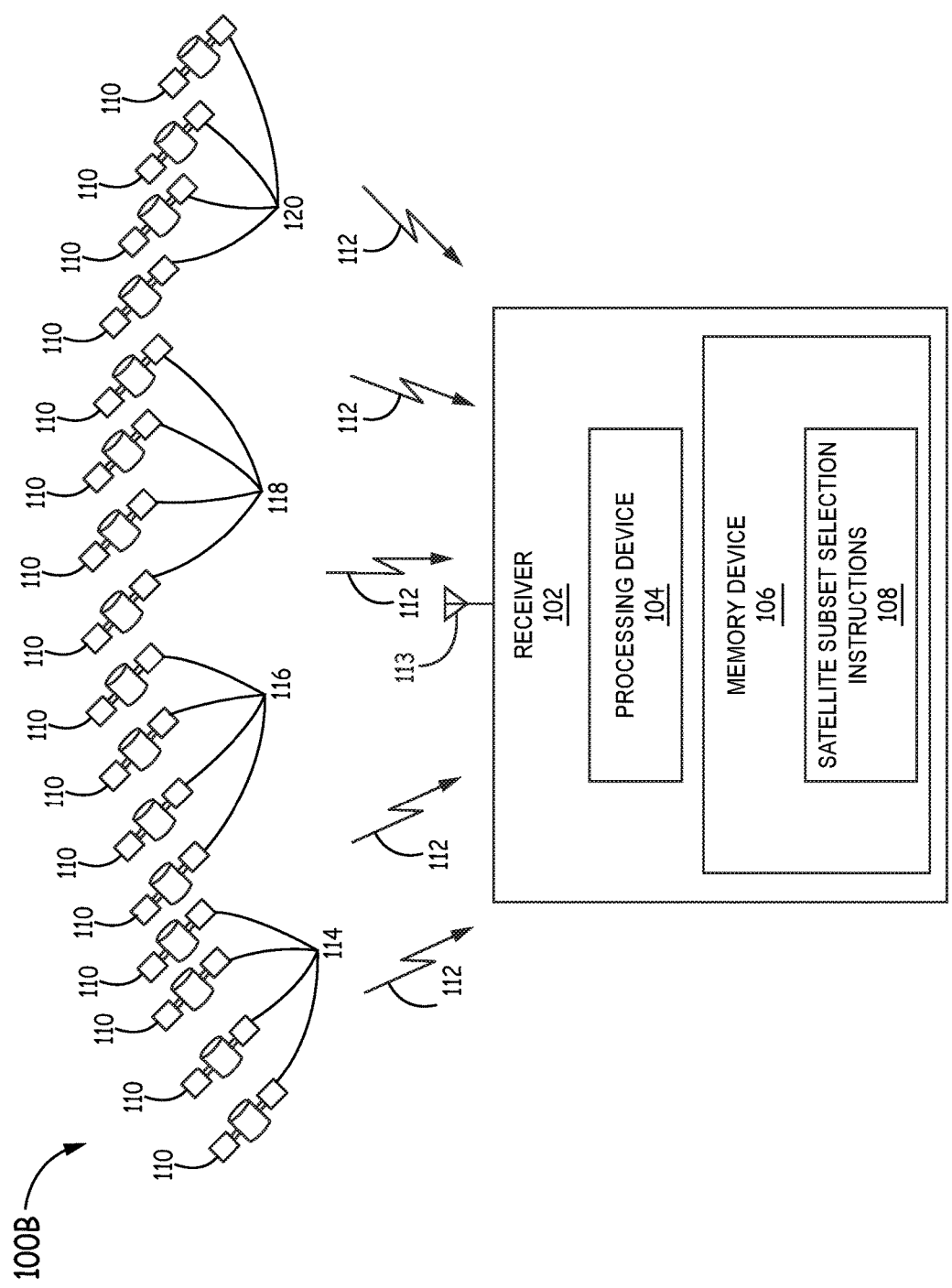
Figure 1C:
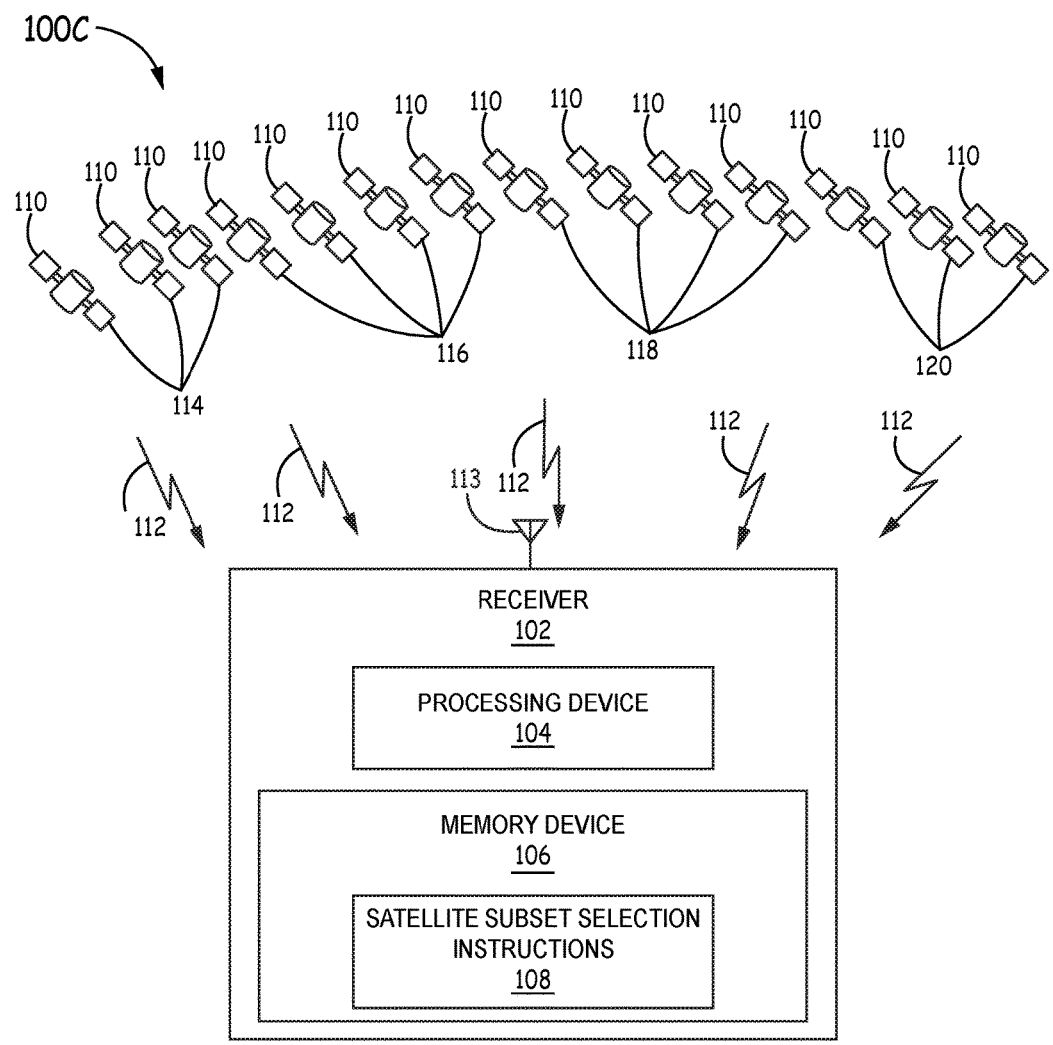

FIGS. 1A-1C are block diagrams of example systems 100A-100C for satellite subset selection for use in monitoring the integrity of computed navigation solutions. The systems 100A-100C include a plurality of GNSS satellites 110 in view of a GNSS receiver 102. In some exemplary embodiments, the plurality of GNSS satellites 110 can include satellites from more than one constellation, such as GPS, GLONASS, Galileo, BeiDou, etc. However, in some other exemplary embodiments, the plurality of GNSS satellites 110 can all be from a single constellation. Furthermore, the systems 100A-100C include the GNSS receiver 102 that receives signals 112 from one or more of the GNSS satellites 110 in the plurality of GNSS satellites 110 using at least one GNSS antenna 113. The received signals 112 can be used by the GNSS receiver 102 to calculate a navigation solution for the GNSS receiver 102 according to methods known to one having skill in the art. A navigation solution can include, but is not limited to, a position, a velocity, and/or a time of the GNSS receiver 102.

Referring to FIG. 1A, in exemplary embodiments, the GNSS receiver 102 includes (or is coupled to) at least one GNSS antenna 113 as well as at least one processing device 104 that can execute satellite subset selection instructions 108 stored in at least one memory device 106 in order to group the plurality of GNSS satellites 110 into a plurality of subsets 114, 116, 118. How the plurality of GNSS satellites 110 will be divided in subsets 114, 116, 118 can depend on several factors including, but not limited to, the number of satellites and constellations available, the probabilities of satellite and constellation faults, integrity requirements, available processing power of the receiver, etc. For example, with a fewer number of visible GNSS satellites 110, fewer GNSS satellites 110 may be included in each subset 114, 116, 118 to meet certain integrity requirements of the navigation sub-solutions that are computed using the subsets 114, 116, 118.

As stated above, the at least one processing device 104 is configured to group the GNSS satellites 110 into different numbers of subsets 114, 116, 118. While three subsets 114, 116, 118 are shown in FIG. 1A and four subsets 114, 116, 118, 120 are shown in FIGS. 1B and 1C, the number of subsets 114, 116, 118, 120 can be any number greater than one as long as each subset 114, 116, 118, 120 includes at least one satellite 110, less than the total number of GNSS satellites 110 in the plurality of GNSS satellites 110, and at least one subset includes more than one satellite, wherein each satellite 110 is included in at most one subset 114, 116, 118, 120. In exemplary embodiments, at least one of subset 114, 116, 118, and/or 120 includes only one GNSS satellite. In exemplary embodiments, at least one of subsets 114, 116, 118, and/or 120 includes a plurality of GNSS satellites. FIG. 1A is one exemplary embodiment showing a possible configuration. In FIG. 1A, there are a plurality of subsets 114, 116, 118 and the number of GNSS satellites 110 included in each subset 114, 116, 118 is greater than one, less than the total number of GNSS satellites 110 in the plurality of GNSS satellites 110, and each satellite 110 is included in at most one subset 114, 116, 118.

In addition to the configuration above shown in FIG. 1A, in some exemplary embodiments, the at least one processing device 104 can be further configured to equally divide the plurality of GNSS satellites 110 into the plurality of subsets 114, 116, 118, 120 if the number of subsets 114, 116, 118, 120 is a divisor of the number of GNSS satellites 110, as shown in FIG. 1B. Since the system 100B includes four subsets 114, 116, 118, 120 and sixteen GNSS satellites 110, the number of subsets 114, 116, 118, 120 is a divisor of the number of GNSS satellites 110, so each subset 114, 116, 118, 120 can include an equal number of GNSS satellites 110. However, even when the number of subsets 114, 116, 118, 120 is a divisor of the number of GNSS satellites 110, the GNSS satellites 110 do not have to be divided equally among the subsets 114, 116, 118, 120, as shown in FIG. 1A.

Furthermore, in some other exemplary embodiments, the at least one processing device 104 can be configured to group the plurality of GNSS satellites 110 into the plurality of subsets 114, 116, 118, 120, wherein each subset 114, 116, 118, 120 of the plurality of subsets 114, 116, 118, 120 includes a number of satellites within plus or minus one of any other subset 114, 116, 118, 120 of the plurality of subsets 114, 116, 118, 120, as shown in FIG. 1C. For example, the system's 100C subsets 114, 120 include only one satellite 110 less than subsets 116, 120. In some embodiments, the at least one processing device 104 can be configured this way when the number of subsets 114, 116, 118, 120 is not a divisor of the number of GNSS satellites 110 in the plurality of GNSS satellites 110. While the GNSS satellites 110 in each subset 114, 116, 118, 120 are shown in FIGS. 1A-1C as being adjacent to one another, in other embodiments, the GNSS satellites 110 in a given subset 114, 116, 118, 120 do not need to be adjacent to one another.

In exemplary embodiments, the at least one processing device 104 is configured to group the plurality of GNSS satellites 110 into the plurality of subsets 114, 116, 118, 120, etc. based on at least in part on the relative geometries of the plurality of GNSS satellites 110 with respect to the GNSS receiver 102 (positioned at/near the user). In exemplary embodiments, by selecting the GNSS satellites 110 for each GNSS satellite cluster (such as subset 114, 116, 118, 120) based at least in part on the relative geometries of the GNSS satellites 110 with respect to the GNSS receiver 102, the computed protection levels are minimized. Since the computed protection levels are dependent on the geometry of the relative GNSS satellites 110 within each GNSS satellite 110 cluster (such as subset 114, 116, 118, 120), the GNSS receiver 102 does not always need to perform the GNSS satellite 110 cluster distribution (methodology used to create each GNSS satellite 100 cluster of GNSS satellites 110) every time it performs ARAIM. In exemplary embodiments, the GNSS satellite 110 cluster distribution occurs when significant changes to the geometry of the GNSS satellites 110 occur, such as through loss or removal of a GNSS satellite 110 or introduction of a new GNSS satellite 110. In exemplary embodiments, the GNSS satellite 110 cluster distribution occurs when a pre-defined quantity of time has elapsed to modify the relative geometry of the GNSS satellites 110.

In exemplary embodiments, the determination of GNSS satellite 110 cluster distribution can be stated as how to split a quantity of N GNSS satellites 110 into a quantity of M GNSS satellite 110 clusters (such as subset 114, 116, 118, 120). In exemplary embodiments, it is desirable to distribute the N GNSS satellites 110 into the M GNSS satellite 110 clusters such that it minimizes the computed protection levels when using the clustered ARAIM methodology. In exemplary embodiments, the determination of GNSS satellite 110 cluster distribution results in improving the dilution-of-precision (DOP) of each individual GNSS satellite 110 cluster, particularly for the GNSS satellite 110 cluster with the worst DOP of all of the GNSS satellite 110 clusters. A number of methodologies can be followed in order to improve the geometry of each GNSS satellite 110 cluster as described herein, such as methodologies based on: (1) azimuth; (2) most opposite satellites, etc.

In exemplary embodiments based on azimuth, the at least one processing device 104 is configured to order the plurality of GNSS satellites 110 into an ordered list of the GNSS satellites 110 based on the azimuth of each GNSS satellite 110 relative to the GNSS receiver 102. The at least one processing device 104 is further configured to proceed through the ordered list, assigning one GNSS satellite 110 at a time to each of the M GNSS satellite 110 clusters until each of the M GNSS satellite 110 clusters has had one GNSS satellite 110 assigned, after which the processing device will return to the first of the M GNSS satellite 110 clusters to continue assignments of the GNSS satellites 110. In exemplary embodiments, this ordered assignment of GNSS satellites 110 to the M GNSS satellite 110 clusters continues until each GNSS satellite 110 in the ordered list has been assigned to one of the M GNSS satellite 110 clusters. In exemplary embodiments, a pseudocode implementation of this process is as follows:

```
L = list of N satellites;
C = list of M empty clusters;
OL = sort(L);
iClus = 1;
for i = 1:N
    C(iClus) = OL(i);
    iClus++;
    if iClus > M
        iClus = 1;
    end
end
```

In exemplary embodiments based on "most opposite satellite", the at least one processing device 104 is configured to determine a GNSS satellite 110 not already assigned to a GNSS satellite 110 cluster (such as subset 114, 116, 118, 120) that is most opposite to the GNSS satellites 110 already assigned to the GNSS satellite 110 cluster (such as subset 114, 116, 118, 120). In exemplary embodiments, this is way of maximizing the azimuth difference between a circular mean of already assigned GNSS satellites 110 and the remaining candidate GNSS satellites 110 that have not already been assigned to a GNSS satellite 110 cluster (such as subset 114, 116, 118, 120). In exemplary embodiments a pseudocode implementation of this process is as follows:

```
A = list of respective azimuths of N satellites;
C = list of satellites in the current cluster;
S = size of current cluster; // S ~ N / M
C(1) = rand(N); // pick a random start satellite
for i = 2:S
    D = empty list of azimuth differences;
    for j = 1:N
        D(j) = min{D(j), A(j) − A(C(1)), ..., A(j) − A(C(i−1))};
    end
    C(i) = j such that D(j) is the maximum of D;
end
remove satellites from C from the list of available satellites;
repeat until M clusters have been determined;
```

In exemplary embodiments, other possible approaches use the space angle between the GNSS satellites 110 (not just the azimuth) or the absolute position of the GNSS satellites 110 and/or the relative distances of the GNSS satellites 110 from one another and/or the GNSS receiver 102. In exemplary embodiments, the GNSS satellites 110 are ordered not only by azimuth, but also by the azimuth difference between adjacent GNSS satellites 110. Accordingly, the two closest GNSS satellites 110 would not end up in the same GNSS satellite 110 cluster. In exemplary embodiments, these methodologies distribute the GNSS satellites 110 into the required number of GNSS satellite 110 clusters in a way that the clustered ARAIM produces protection levels close to the ideal protection level.

In exemplary embodiments, using clustered ARAIM includes computing covariance matrices describing the statistical behavior of respective sub-solutions. In exemplary embodiments, a Sherman-Morrison formula is used to remove a satellite from the full-solution. In exemplary embodiments, G is a satellite geometry matrix and W is a corresponding weighting matrix. Denote $g_i^T$ the i-th row of G, $A=(G^TWG)^{-1}$ and $A_i=(G_i^TW_iG_i)^{-1}$, where $G_i$ and $W_i$ denote W and G respectively with the i-th row set to all zeros. Furthermore, let $S=AG^TW$ and $S_i=A_iG_i^TW_i$. Then A is the covariance matrix of the full solution, $A_i$ the covariance matrix of the sub-solution removing the i-th satellite and $B_i=(S_i-S)\cdot W^{-1}\cdot(S_i-S)^T$ the separation covariance matrix for that sub-solution.

In exemplary embodiments, the determination of GNSS satellite 110 cluster distribution results in improving the covariance matrix of each individual GNSS satellite 110 cluster, particularly for the GNSS satellite 110 cluster with the worst covariance matrix of all of the GNSS satellite 110 clusters.

In exemplary embodiments, the determination of GNSS satellite 110 cluster distribution is based on the covariance matrices of the highest-order sub-solutions, i.e. combinations of the least number of clusters assumed for the clustered ARAIM. In particular the covariance matrix for the worst such sub-solution (that does not corresponds to a constellation exclusion) is being improved.

The at least one processing device 104 in FIGS. 1A-1C is further configured to calculate a plurality of navigation sub-solutions based on data received at the receiver 102 using the at least one GNSS antenna 113 from the plurality of GNSS satellites 110, wherein each navigation sub-solution of the plurality of navigation sub-solutions is calculated with at least one different subset 114, 116, 118, 120 of the plurality of subsets 114, 116, 118, 120 excluded. That is, a navigation sub-solution of the plurality of navigation sub-solutions is calculated by excluding at least one subset 114, 116, 118, 120 of the plurality of subsets 114, 116, 118, 120 and calculating a navigation solution with the GNSS satellites 110 in the remaining (un-excluded) subsets 114, 116, 118, 120. At least one different subset 114, 116, 118, 120 is excluded for each navigation sub-solution. Thus, to calculate a plurality of navigation sub-solutions, the process of excluding at least one subset 114, 116, 118, 120 and calculating a navigation solution using the satellites in the remaining subsets 114, 116, 118, 120 is repeated, excluding at least one different subset 114, 116, 118, 120 for each navigation sub-solution until navigation sub-solutions have been calculated for all the combinations of at least one subset 114, 116, 118, 120 excluded.

The number of GNSS satellites 110 excluded when calculating a plurality of navigation sub-solutions can be based on the number of faults that are being protected against. For example, if one fault is being protected against, one subset 114, 116, 118, 120 can be excluded for each navigation sub-solution. If two faults are being protected against, a first set of navigation sub-solutions can be calculated with one subset 114, 116, 118, 120 excluded and a second set of navigation sub-solutions can be calculated with two subsets 114, 116, 118, 120 excluded for each navigation sub-solution. The first set of navigation sub-solutions and the second set of navigation sub-solutions can then be combined to form the complete set of navigation sub-solutions for a two fault scenario.

For example, referring to FIG. 1C, if up to two faults were to be considered based on the four subsets of 114, 116, 118, and 120, a first set of navigation sub-solutions would be calculated using the following groups of subsets 114, 116, 118, subsets 114, 116, 120, subsets 114, 118, 120, and subsets 116, 118, 120, to account for one fault and a second set of navigation sub-solutions would be calculated using the following groups of subsets 114, 116, subsets 114, 118, subsets 114, 120, subsets 116, 118, subsets 116, 120, and subsets 118, 120 to account for two faults. The combination of the first set of navigation sub-solutions and the second set of navigation sub-solutions would result in a total of ten navigation sub-solutions to account for the two faults. As discussed above, in some examples, the number of required sub-solutions is independent of the number of visible satellites and is instead dependent on the number of subsets 114, 116, 118, 120.

Since an entire subset 114, 116, 118, 120 is excluded for a navigation sub-solution, a single navigation sub-solution can protect from several different fault modes since multiple satellites within one subset 114, 116, 118, 120 can become faulty and the navigation sub-solution covers all such cases. Therefore, the total number of computed navigation sub-solutions is reduced. The number of faults covered by a navigation sub-solution will depend on the size of the subsets 114, 116, 118, 120 and how many of the subsets 114, 116, 118, 120 are removed when computing the navigation sub-solutions.

The at least one processing device 104 in FIGS. 1A-1C is further configured to calculate a protection level based on the plurality of navigation sub-solutions. A protection level is a statistical bound to the position error of a position that is calculated using the GNSS satellites 110. Examples of protection levels are the horizontal protection level (HPL) and the vertical protection level (VPL). The HPL is the radius of a circle in the horizontal plane with its center being at the true position, which describes the region assured to contain the indicated horizontal position of an aircraft and provides a bound on the horizontal position of the aircraft with a probability derived from the integrity requirement. The VPL is half the length of a segment on the vertical axis with its center being at the true position, which describes the region that is assured to contain the indicated vertical position of the aircraft and provides a bound on the vertical position of the aircraft with a probability derived from the integrity requirement. HPL and VPL can be calculated using methods known to one having skill in the art. For example, the HPL and VPL can be calculated based on satellite geometry given by a measurement observation matrix (H) and based on the noise factor given by a weighting factor matrix (W).

In exemplary embodiments, the vertical protection level (VPL) is computed as a numerical solution of the following equation (usually iteratively):

$$2 \cdot Q\left(\frac{VPL - b_0}{\sigma^{(0)}}\right) + \sum_{k=1}^{N_{fm}} P_k \cdot Q\left(\frac{VPL - T_k - b_k}{\sigma^{(k)}}\right) = PHMI - P_{unmonitored}$$

where $b_k$ is the combined bias effect, $\sigma^{(k)}$ is the standard deviation of k-th fault mode, $N_{fm}$ is the total number of fault modes, $P_k$ denotes the onset probability of k-th fault mode and $T_k$ is the k-th fault mode threshold. Additionally, $b_0$ and $\sigma^{(0)}$ refer to the fault-free case, i.e. the full solution.

While several different fault modes can be accounted for in a single navigation sub-solution, it is possible that some healthy satellites are removed, as well. However, removing some healthy satellites (i.e. useful measurements) adversely affects the protection level (e.g., the VPL, the HPL, etc.). This shortcoming can be countered by modifying the number of subsets 114, 116, 118, 120 that the plurality of GNSS satellites 110 are divided into. As a result, it is possible to trade-off performance versus computational load based on the specific needs of each case. For example, if the computational performance of dividing the plurality of GNSS satellites 110 into four subsets 114, 116, 118, 120 is not sufficient, the number of subsets 114, 116, 118, 120 can be decreased to satisfy the required computational performance, so that fewer navigation sub-solutions will need to be computed for the same amount of faults required. Or, in some embodiments, if a protection level is met, but a reduction in the computational load is desired, the number of subsets 114, 116, 118, 120 can similarly be decreased. On the contrary, if the computational performance is satisfied, but the at least one processing device 104 is further configured to calculate a protection level and the protection level is above a threshold, the number of GNSS satellites 110 included in each subset 114, 116, 118, 120 can be reduced or the number of subsets 114, 116, 118, 120 increased or both. In some embodiments, this can be a dynamic iterative process by the at least one processing device 104 until the integrity of the navigation sub-solutions and the protection level is met. However, in some embodiments where the integrity and protection level cannot be met, an alarm can be triggered to notify the operator of the receiver that the protection level is above a threshold. As an example, an alert limit is set to 100 meters. If the calculated protection level is 85 meters, the processing device will not trigger the alarm. However, if the calculated protection level is 110 meters, the processing device can be configured to trigger the alarm and notify the flight crew.

In exemplary embodiments, a test statistic, which consists of the separation between the full-solution, is created based on all in view satellites and each sub-solution. This test statistic is then compared to the respective threshold. If the threshold is exceeded an alert is issued. The threshold is computed based on the test statistic covariance and its allocated probability of false alarm, $P_{fa}$. The computed protection levels will be a function of these thresholds, the covariance of each sub-solution, and the impact of the pseudorange biases.

Furthermore, in some embodiments, the at least one processing device 104 is configured to determine whether at least one subset 114, 116, 118, 120 of the plurality of subsets 114, 116, 118, 120 includes a fault. In exemplary embodiments, the at least one processing device 104 can be configured to determine whether at least one subset 114, 116, 118, 120 of the plurality of subsets 114, 116, 118, 120 includes a fault using the solution separation method, as known to one having skill in the art, wherein the sub-solutions used for the solution separation method are a plurality of sub-solutions calculated by respectively excluding at least one subset 114, 116, 118, 120 in a manner as discussed above. That is, in an exemplary embodiments, a difference is computed between a full navigation solution using all the GNSS satellites 110 and each of the navigation sub-solutions for each of the subsets 114, 116, 118, 120. If the difference is greater than a threshold, a fault can be determined to be present in the full navigation solution.

In exemplary embodiments, the at least one processing device 104 is configured to incorporate the impact of biases in the pseudoranges and uses two different error models: (1) an integrity error model (which is used for terms that impact the computed protection levels); and (2) an accuracy error model. These models differ in the overbounding of their respective cumulative distribution functions (CDFs).

The at least one processing device 104 can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The at least one processing device 104 can also include functions with software programs, firmware, or other computer readable instructions for carrying out various process tasks, calculations, and control functions used in the present embodiments.

The at least one memory device 106 can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

Figure 2:
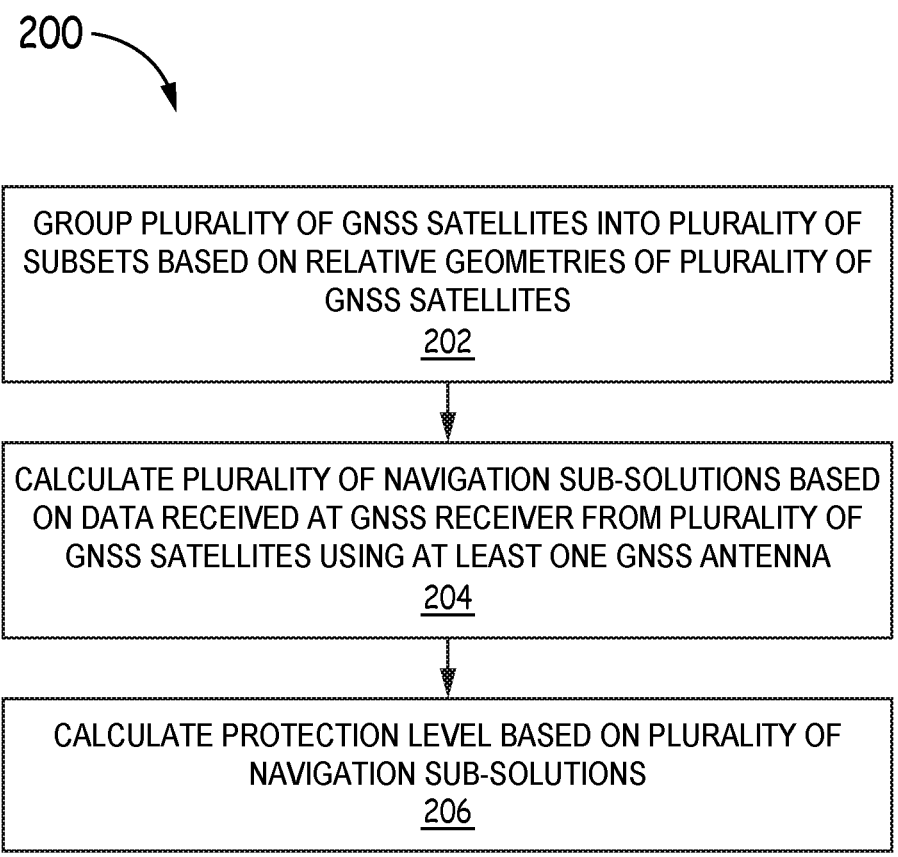
FIG. 2 is a flow diagram of an example method for satellite subset selection for use in monitoring the integrity of computed navigation solutions.

FIG. 2 is a flow diagram of an example method 200 for satellite subset selection for use in monitoring the integrity of computed navigation solutions. The method 200 comprises grouping a plurality of GNSS satellites in view of the GNSS receiver into a plurality of subsets based on relative geometries of the plurality of GNSS satellites relative to the GNSS receiver, wherein a satellite of the plurality of GNSS satellites is included in at most one subset of the plurality of subsets, wherein each subset of the plurality of subsets includes at least one satellite of the plurality of GNSS satellites and less than all GNSS satellites of the plurality of GNSS satellites, and wherein at least one subset includes more than one GNSS satellite (block 202). In some embodiments, the plurality of GNSS satellites and the plurality of subsets can have some or all of the same characteristics of the plurality of GNSS satellites 110 and the plurality of subsets 114, 116, 118, 120 discussed above in FIGS. 1A-1C. For example, in some embodiments, the plurality of satellites include satellites from more than one constellation (e.g., GPS, GLONASS, Galileo, BeiDou).

The plurality of GNSS satellites can be grouped by dividing the satellites into more than one subset such that each subset 114, 116, 118, 120 includes at least one GNSS satellite 110, less than the total number of GNSS satellites 110 in the plurality of GNSS satellites 110, and at least one subset includes more than one GNSS satellite, wherein each GNSS satellite 110 is included in at most one subset 114, 116, 118, 120. In some embodiments, grouping the plurality of GNSS satellites into the plurality of subsets includes selecting an equal number of GNSS satellites for each subset if the number of subsets in the plurality of subsets is a divisor of the number of GNSS satellites in the plurality of GNSS satellites. In other embodiments, grouping the plurality of GNSS satellites into the plurality of subsets includes dividing the plurality of GNSS satellites into the plurality of subsets, wherein each subset of the plurality of subsets includes neither two more GNSS satellites nor two less GNSS satellites than another subset of the plurality of subsets.

Method 200 further comprises calculating a plurality of navigation sub-solutions, wherein each navigation sub-solution of the plurality of navigation sub-solutions is calculated based on data received at the GNSS receiver from the plurality of GNSS satellites at the receiver through at least one antenna with at least one distinct subset of the plurality of subsets excluded (block 204). In some exemplary embodiments, calculating a plurality of navigation sub-solutions using the plurality of subsets can be done in the same or a similar manner as discussed above in FIGS. 1A-1C. That is, a navigation sub-solution of the plurality of navigation sub-solutions is calculated by excluding at least one subset of the plurality of subsets and calculating a navigation solution with the GNSS satellites in the remaining (un-excluded) subsets. At least one different subset is excluded for each navigation sub-solution. Thus, to calculate a plurality of navigation sub-solutions, the process of excluding at least one subset and calculating a navigation solution using the GNSS satellites in the remaining subsets is repeated, excluding at least one different subset for each navigation sub-solution until navigation sub-solutions have been calculated for all the combinations of at least one subset excluded. In addition, a full navigation solution can be calculated using all the GNSS satellites in the plurality of GNSS satellites.

Similar to above, the number of GNSS satellites excluded when calculating a plurality of navigation sub-solutions can be based on the number of faults that are being protected against. For example, if one fault is being protected against, one subset can be excluded for each navigation sub-solution. If two faults are being protected against, a first set of navigation sub-solutions can be calculated with one subset excluded and a second set of navigation sub-solutions can be calculated with two subsets excluded for each navigation sub-solution. The first set of navigation sub-solutions and the second set of navigation sub-solutions can then be combined to form the complete set of navigation sub-solutions for a two fault scenario.

Method 200 can further comprise calculating a protection level (e.g., the VPL, the HPL, etc.) (block 206). Calculating a VPL and a HPL can be done according to methods known to one having skill in the art and as discussed above. If the protection level is above a threshold, the method 200 can further comprise increasing the number of subsets. Furthermore, method 200 can further comprise triggering an alarm if a protection level is above a threshold.

In some embodiments, method 200 further comprises determining whether a subset of the plurality of subsets includes a fault if the protection level is above a threshold. Similarly, in some exemplary embodiments, determining whether a subset of the plurality of subsets includes a fault can be done in the same or a similar manner as discussed above in FIGS. 1A-1C. For example, in some exemplary embodiments, determining whether a subset includes a fault can include computing a difference between a full navigation solution using all the satellites and each of the navigation sub-solutions for each of the subsets. If the difference is greater than a threshold, a fault can be determined to be present in the full navigation solution.

One or more actions described in the present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored in any appropriate computer program product that includes a computer readable medium used for storage of computer readable instructions or data structures. Such a computer readable medium can be any available media that can be accessed by a general purpose or special purpose computer or processor, or any programming logic device.

Figure 3A:
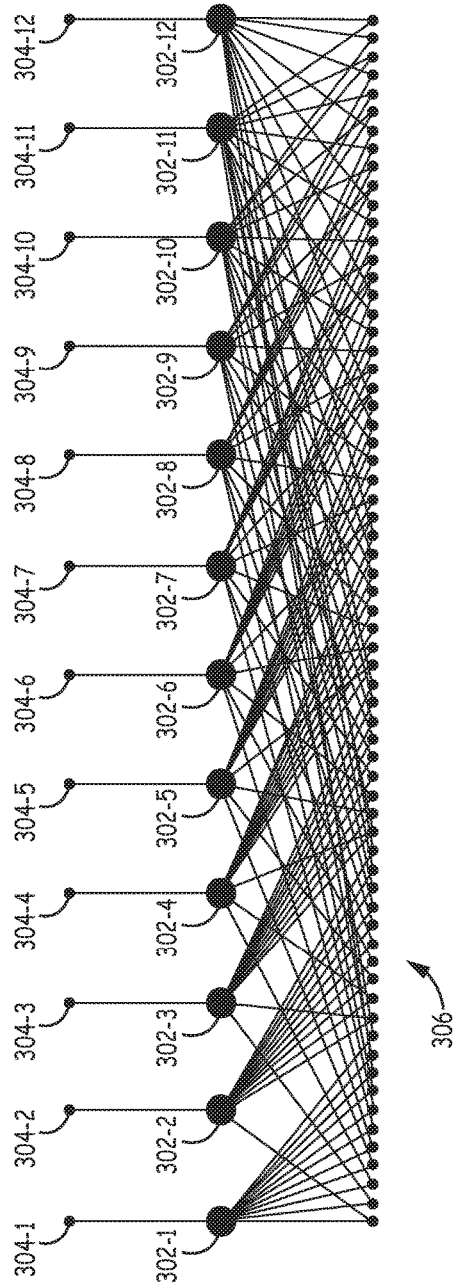
FIGS. 3A-3B illustrate the large difference in quantity of sub-solutions necessary in traditional ARAIM versus clustered ARAIM.
Figure 3B:
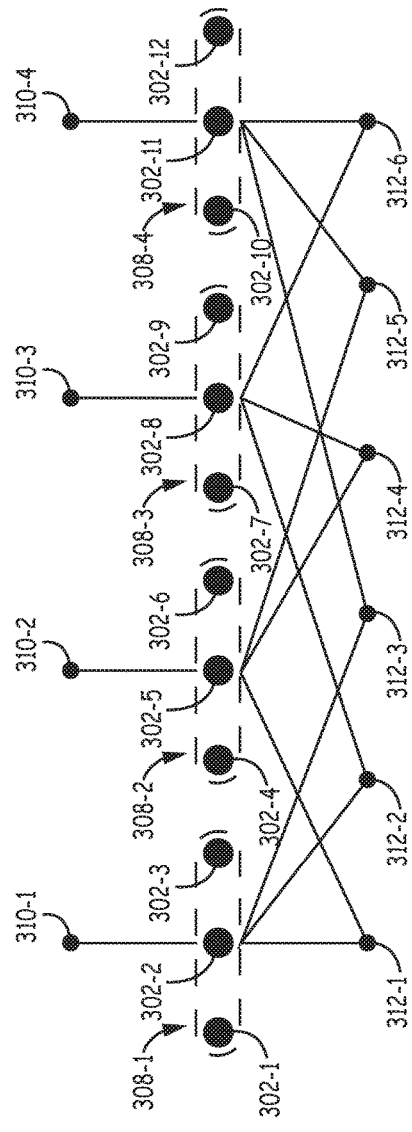

FIGS. 3A-3B illustrate the large difference in quantity of sub-solutions necessary in traditional ARAIM verses clustered ARAIM in an exemplary embodiment having 12 GNSS satellites. Both of FIGS. 3A-3B display 12 GNSS satellites 302 (including satellites 302-1 through 302-12), but FIG. 3A uses traditional ARAIM while FIG. 3B uses clustered ARAIM. FIG. 3A shows that excluding one GNSS satellite in each first-order sub-solution and two GNSS satellites in each second-order sub-solution leads to 12 first-order sub-solutions 304 (including first-order sub-solutions 304-1 through 304-12) and 66 second-order sub-solutions 306 (including unlabeled second-order sub-solutions 306-1 through 306-66) with lines going to the associated GNSS satellites 302. In contrast, the 12 GNSS satellites 302 (including satellites 302-1 through 302-12) in FIG. 3B are distributed into four clusters/subsets 308 (including clusters/subset 308-1 through clusters/subset 308-4). Distributing the GNSS satellites 302 into four clusters/subsets 308 and then excluding one cluster in the first-order sub-solutions and two clusters in the second-order sub-solutions leads to only 4 first-order sub-solutions 310 (including first-order sub-solutions 310-1 through 310-4) and 6 second-order sub-solutions 312 (including second-order sub-solutions 312-1 through 312-6), while still covering any combination of one or two faulty GNSS satellites 302. In this example, the total number of sub-solutions necessary to compute the solution in FIG. 3B using clustered ARAIM from FIG. 3A using traditional ARAIM is reduced from 78 (12 first-order sub-solutions 304 and 66 second-order sub-solutions 306) to 10 (4 first-order sub-solutions 310 and 6 second-order sub-solutions 312).

In exemplary embodiments, equation (2) below is used to compute the maximum number of simultaneous single faults that needs to be monitored. This number will depend mainly on the number of available satellites, n, and their respective fault probabilities. If we denote the maximum number of simultaneous single faults that needs to be monitored $N_f$, then the associated number of fault modes can be computed as $$N_{satfm} = n + \binom{n}{2} + \ldots + \binom{n}{N_f}$$

This number does not include the faults modes related to constellation faults. Clearly, the total number of fault-modes, and thus sub-solutions, which needs to be computed, can become considerably large when 2 or more simultaneous faults need to be monitored and a large number of satellites are available.

In exemplary embodiments, the satellites in each constellation are grouped into a set of clusters/subsets and creates each sub-solution by combining these clusters. This allows each sub-solution to cover several fault-modes. Let all n satellites be distributed into m mutually exclusive clusters and denote $n_1 \ldots n_m$ the sizes of the respective clusters. When a sub-solution removing the first cluster is created, it indeed covers many fault modes. All $n_1$ single (or $1^{st}$-order) faults, $n_2(n_2-1)/2$ double (or $2^{nd}$-order) faults up to $$\binom{n_1}{N_f}$$

faults of $N_f$ satellites at a time are monitored. This way, the number of sub-solutions is greatly reduced.

Depending on the desired computational efficiency, number of satellites and constellations and $N_f$, it is possible to adapt the number of clusters per constellation to fit a particular scenario. The concept also simplifies worst-case execution time estimation, because the number of sub-solutions does not depend on the number of satellites anymore but on the total number of clusters.

Example Embodiments

Example 1 includes a global navigation satellite system (GNSS) receiver comprising: a processing device configured to: group a plurality of GNSS satellites in view of the GNSS receiver into a plurality of subsets based on relative geometries of at least one of (1) the plurality of GNSS satellites relative to the GNSS receiver and (2) the plurality of satellites relative to one another, wherein a GNSS satellite of the plurality of GNSS satellites is included in at most one subset of the plurality of subsets, wherein each subset of the plurality of subsets includes at least one GNSS satellite of the plurality of GNSS satellites and less than all GNSS satellites of the plurality of GNSS satellites, and wherein at least one subset includes more than one GNSS satellite; and calculate a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded.

Example 2 includes the GNSS receiver of Example 1, wherein the processing device is configured to group the plurality of GNSS satellites in view of the GNSS receiver into the plurality of subsets based on the relative geometries of at least one of (1) the plurality of GNSS satellites relative to the GNSS receiver and (2) the plurality of satellites relative to one another is at least in part based on at least one of: (1) elevations and azimuths of at least two of the plurality of GNSS satellites; (2) a position of the GNSS receiver and positions of at least two of the plurality of GNSS satellites; (3) relative distances between at least two of the plurality of GNSS satellites; (4) relative distances between the GNSS receiver and at least two of the plurality of GNSS satellites; and (5) a covariance matrix of at least two of the plurality of GNSS satellites.

Example 3 includes the GNSS receiver of any of Examples 1-2, wherein the processing device is further configured to: calculate a full navigation solution using all GNSS satellites of the plurality of GNSS satellites.

Example 4 includes the GNSS receiver of Example 3, wherein the processing device is further configured to: calculate covariances for each navigation sub-solution; calculate covariances for separations between each navigation sub-solution and the full navigation solution; and calculate a protection level based on the covariances for each navigation sub-solution and the covariances for the separations between each navigation sub-solution and the full navigation solution.

Example 5 includes the GNSS receiver of any of Examples 3-4, wherein the processing device is further configured to: calculate covariances for each navigation sub-solution; calculate covariances for separations between each navigation sub-solution and the full navigation solution; calculate a protection level based on the covariances for each navigation sub-solution and the covariances for the separations between each navigation sub-solution and the full navigation solution; calculate a set of test statistics based on the separations between each navigation sub-solution and the full navigation solution; and detect a fault by comparing the set of test statistics with a pre-defined threshold.

Example 6 includes the GNSS receiver of any of Examples 3-5, wherein the processing device is further configured to: determine whether a subset of the plurality of subsets includes a fault based on whether a difference between a navigation sub-solution that is calculated with the subset excluded and the full navigation solution is greater than a threshold.

Example 7 includes the GNSS receiver of any of Examples 1-6, wherein the plurality of GNSS satellites are from more than one constellation of GNSS satellites.

Example 8 includes a method for satellite subset selection, the method comprising: grouping a plurality of GNSS satellites in view of the GNSS receiver into a plurality of subsets based on relative geometries of at least one of (1) the plurality of GNSS satellites relative to the GNSS receiver and (2) the plurality of satellites relative to one another, wherein a satellite of the plurality of GNSS satellites is included in at most one subset of the plurality of subsets, wherein each subset of the plurality of subsets includes at least one satellite of the plurality of GNSS satellites and less than all GNSS satellites of the plurality of GNSS satellites, and wherein at least one subset includes more than one GNSS satellite; and calculating a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded.

Example 9 includes the method of Example 8, wherein grouping the plurality of GNSS satellites in view of the GNSS receiver into the plurality of subsets based on the relative geometries of at least one of (1) the plurality of GNSS satellites relative to the GNSS receiver and (2) the plurality of satellites relative to one another is at least in part based on at least one of: (1) elevations and azimuths of at least two of the plurality of GNSS satellites; (2) a position of the GNSS receiver and positions of at least two of the plurality of GNSS satellites; (3) relative distances between at least two of the plurality of GNSS satellites; (4) relative distances between the GNSS receiver and at least two of the plurality of GNSS satellites; and (5) a covariance matrix of at least two of the plurality of GNSS satellites.

Example 10 includes the method of any of Examples 8-9, further comprising: calculating a full navigation solution using all GNSS satellites of the plurality of GNSS satellites.

Example 11 includes the method of Example 10, further comprising: calculating covariances for each navigation sub-solution; calculating covariances for separations between each navigation sub-solution and the full navigation solution; and calculating a protection level based on the covariances for each navigation sub-solution and the covariances for the separations between each navigation sub-solution and the full navigation solution.

Example 12 includes the method of any of Examples 10-11, further comprising: calculate covariances for each navigation sub-solution; calculate covariances for separations between each navigation sub-solution and the full navigation solution; calculate a protection level based on the covariances for each navigation sub-solution and the covariances for the separations between each navigation sub-solution and the full navigation solution; calculate a set of test statistics based on the separations between each navigation sub-solution and the full navigation solution; and detect a fault by comparing the set of test statistics with a pre-defined threshold.

Example 13 includes the method of any of Examples 10-12, further comprising: determining whether a subset of the plurality of subsets includes a fault based on whether a difference between a navigation sub-solution that is calculated with the subset excluded and the full navigation solution is greater than a threshold.

Example 14 includes the method of any of Examples 8-13, wherein the plurality of GNSS satellites are from more than one constellation of GNSS satellites.

Example 15 includes a non-transitory computer-readable medium having computer-executable instructions stored thereon which, when executed by one or more processors, cause the one or more processors to: group a plurality of GNSS satellites in view of the GNSS receiver into a plurality of subsets based on relative geometries of at least one of (1) the plurality of GNSS satellites relative to the GNSS receiver and (2) the plurality of satellites relative to one another, wherein a satellite of the plurality of GNSS satellites is included in at most one subset of the plurality of subsets, wherein each subset of the plurality of subsets includes at least one satellite of the plurality of GNSS satellites and less than all GNSS satellites of the plurality of GNSS satellites, and wherein at least one subset includes more than one satellite; and calculate a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded.

Example 16 includes the non-transitory computer-readable medium of Example 15, the instructions cause the one or more processors to group the plurality of GNSS satellites in view of the GNSS receiver into the plurality of subsets based on the relative geometries of at least one of (1) the plurality of GNSS satellites relative to the GNSS receiver and (2) the plurality of satellites relative to one another is at least in part based on at least one of: (1) elevations and azimuths of at least two of the plurality of GNSS satellites; (2) a position of the GNSS receiver and positions of at least two of the plurality of GNSS satellites; (3) relative distances between at least two of the plurality of GNSS satellites; (4) relative distances between the GNSS receiver and at least two of the plurality of GNSS satellites; and (5) a covariance matrix of at least two of the plurality of GNSS satellites.

Example 17 includes the non-transitory computer-readable medium of any of Examples 15-16, wherein the instructions cause the one or more processors to calculate a full navigation solution using all GNSS satellites of the plurality of GNSS satellites.

Example 18 includes the non-transitory computer-readable medium of Example 17, wherein the instructions cause the one or more processors to: calculate covariances for each navigation sub-solution; calculate covariances for separations between each navigation sub-solution and the full navigation solution; and calculate a protection level based on the covariances for each navigation sub-solution and the covariances for the separations between each navigation sub-solution and the full navigation solution.

Example 19 includes the non-transitory computer-readable medium of any of Examples 17-18, wherein the instructions cause the one or more processors to: calculate covariances for each navigation sub-solution; calculate covariances for separations between each navigation sub-solution and the full navigation solution; calculate a protection level based on the covariances for each navigation sub-solution and the covariances for the separations between each navigation sub-solution and the full navigation solution; calculate a set of test statistics based on the separations between each navigation sub-solution and the full navigation solution; and detect a fault by comparing the set of test statistics with a pre-defined threshold.

Example 20 includes the non-transitory computer-readable medium of any of Examples 17-19, wherein the instructions cause the one or more processors to: determine whether a subset of the plurality of subsets includes a fault based on whether a difference between a navigation sub-solution that is calculated with the subset excluded and the full navigation solution is greater than a threshold.

What is claimed is:

1. A global navigation satellite system (GNSS) receiver comprising:
    a processing device configured to:
      group a plurality of GNSS satellites in view of the GNSS receiver into a plurality of subsets based on relative geometries of at least one of (1) the plurality of GNSS satellites relative to the GNSS receiver and (2) the plurality of GNSS satellites relative to one another, wherein each GNSS satellite of the plurality of GNSS satellites is included in at most one subset of the plurality of subsets, wherein each subset of the plurality of subsets includes;
        at least one GNSS satellite of the plurality of GNSS satellites; and
        fewer than all GNSS satellites of the plurality of GNSS satellites; and
      wherein at least one subset of the plurality of subsets includes;
        more than one GNSS satellite;
      calculate a full navigation solution using all GNSS satellites of the plurality of GNSS satellites;
      calculate a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded, wherein the quantity of navigation sub-solutions to be computed is reduced by excluding at a subset level rather than excluding at a satellite level, wherein the quantity of subsets in the plurality of subsets is selected to balance performance provided by more subsets with decreased computational load provided by fewer subsets; and
      calculate a protection level based on the full navigation solution and the plurality of navigation sub-solutions.

2. The GNSS receiver of claim 1, wherein the processing device is configured to group the plurality of GNSS satellites in view of the GNSS receiver into the plurality of subsets based on the relative geometries of at least one of (1) the plurality of GNSS satellites relative to the GNSS receiver and (2) the plurality of GNSS satellites relative to one another is at least in part based on at least one of:
    (1) elevations and azimuths of at least two of the plurality of GNSS satellites;
    (2) a position of the GNSS receiver and positions of at least two of the plurality of GNSS satellites;
    (3) relative distances between at least two of the plurality of GNSS satellites;
    (4) relative distances between the GNSS receiver and at least two of the plurality of GNSS satellites; and
    (5) a covariance matrix of at least two of the plurality of GNSS satellites.

3. The GNSS receiver of claim 1, wherein the processing device is further configured to:
    calculate covariances for each navigation sub-solution;
    calculate covariances for separations between each navigation sub-solution and the full navigation solution; and
    calculate the protection level based on the covariances for each navigation sub-solution and the covariances for the separations between each navigation sub-solution and the full navigation solution.

4. The GNSS receiver of claim 1, wherein the processing device is further configured to:
    calculate covariances for each navigation sub-solution;
    calculate covariances for separations between each navigation sub-solution and the full navigation solution;
    calculate the protection level based on the covariances for each navigation sub-solution and the covariances for the separations between each navigation sub-solution and the full navigation solution;
    calculate a set of test statistics based on the separations between each navigation sub-solution and the full navigation solution; and
    detect a fault by comparing the set of test statistics with a pre-defined threshold.

5. The GNSS receiver of claim 1, wherein the processing device is further configured to:
    determine whether a subset of the plurality of subsets includes a fault based on whether a difference between a navigation sub-solution that is calculated with the subset excluded and the full navigation solution is greater than a threshold.

6. The GNSS receiver of claim 1, wherein the plurality of GNSS satellites are from more than one constellation of GNSS satellites.

7. A method for global navigation satellite system (GNSS) satellite subset selection, the method comprising:

grouping a plurality of GNSS satellites in view of the GNSS receiver into a plurality of subsets based on relative geometries of at least one of (1) the plurality of GNSS satellites relative to the GNSS receiver and (2) the plurality of GNSS satellites relative to one another, wherein each GNSS satellite of the plurality of GNSS satellites is included in at most one subset of the plurality of subsets, wherein each subset of the plurality of subsets includes:
  at least one GNSS satellite of the plurality of GNSS satellites and
  fewer than all GNSS satellites of the plurality of GNSS satellites; and
wherein at least one subset of the plurality of subsets includes;
  more than one GNSS satellite;
calculating a full navigation solution using all GNSS satellites of the plurality of GNSS satellites
calculating a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded, wherein the quantity of navigation sub-solutions to be computed is reduced by excluding at a subset level rather than excluding at a satellite level, wherein the quantity of subsets in the plurality of subsets is selected to balance increased performance provided by more subsets with decreased computational load provided by fewer subsets; and
calculating a protection level based on the full navigation solution and the plurality of navigation sub-solutions.

8. The method of claim 7, wherein grouping the plurality of GNSS satellites in view of the GNSS receiver into the plurality of subsets based on the relative geometries of at least one of (1) the plurality of GNSS satellites relative to the GNSS receiver and (2) the plurality of GNSS satellites relative to one another is at least in part based on at least one of:
  (1) elevations and azimuths of at least two of the plurality of GNSS satellites;
  (2) a position of the GNSS receiver and positions of at least two of the plurality of GNSS satellites;
  (3) relative distances between at least two of the plurality of GNSS satellites;
  (4) relative distances between the GNSS receiver and at least two of the plurality of GNSS satellites; and
  (5) a covariance matrix of at least two of the plurality of GNSS satellites.

9. The method of claim 7, further comprising:
calculating covariances for each navigation sub-solution;
calculating covariances for separations between each navigation sub-solution and the full navigation solution; and
calculating the protection level based on the covariances for each navigation sub-solution and the covariances for the separations between each navigation sub-solution and the full navigation solution.

10. The method of claim 7, further comprising:
calculate covariances for each navigation sub-solution;
calculate covariances for separations between each navigation sub-solution and the full navigation solution;
calculate the protection level based on the covariances for each navigation sub-solution and the covariances for the separations between each navigation sub-solution and the full navigation solution;

calculate a set of test statistics based on the separations between each navigation sub-solution and the full navigation solution; and
detect a fault by comparing the set of test statistics with a pre-defined threshold.

11. The method of claim 7, further comprising:
determining whether a subset of the plurality of subsets includes a fault based on whether a difference between a navigation sub-solution that is calculated with the subset excluded and the full navigation solution is greater than a threshold.

12. The method of claim 7, wherein the plurality of GNSS satellites are from more than one constellation of GNSS satellites.

13. A non-transitory computer-readable medium having computer-executable instructions stored thereon which, when executed by one or more processors, cause the one or more processors to:
group a plurality of global navigation satellite system (GNSS) satellites in view of the GNSS receiver into a plurality of subsets based on relative geometries of at least one of (1) the plurality of GNSS satellites relative to the GNSS receiver and (2) the plurality of GNSS satellites relative to one another, wherein each GNSS satellite of the plurality of GNSS satellites is included in at most one subset of the plurality of subsets, wherein each subset of the plurality of subsets includes:
  at least one GNSS satellite of the plurality of GNSS satellites; and
  fewer than all GNSS satellites of the plurality of GNSS satellites; and
wherein at least one subset of the plurality of subsets includes:
  more than one satellite;
calculate a full navigation solution using all GNSS satellites of the plurality of GNSS satellites;
calculate a plurality of navigation sub-solutions based on data received at the GNSS receiver from the plurality of GNSS satellites using at least one GNSS antenna, wherein each navigation sub-solution of the plurality of navigation sub-solutions is calculated with at least one different subset of the plurality of subsets excluded, wherein the quantity of navigation sub-solutions to be computed is reduced by excluding at a subset level rather than excluding at a satellite level, wherein the quantity of subsets in the plurality of subsets is selected to balance increased performance provided by more subsets with decreased computational load provided by fewer subsets; and
calculate a protection level based on the full navigation solution and the plurality of navigation sub-solutions.

14. The non-transitory computer-readable medium of claim 13, the instructions cause the one or more processors to group the plurality of GNSS satellites in view of the GNSS receiver into the plurality of subsets based on the relative geometries of at least one of (1) the plurality of GNSS satellites relative to the GNSS receiver and (2) the plurality of GNSS satellites relative to one another is at least in part based on at least one of:
  (1) elevations and azimuths of at least two of the plurality of GNSS satellites;
  (2) a position of the GNSS receiver and positions of at least two of the plurality of GNSS satellites;
  (3) relative distances between at least two of the plurality of GNSS satellites;
  (4) relative distances between the GNSS receiver and at least two of the plurality of GNSS satellites; and (5) a covariance matrix of at least two of the plurality of GNSS satellites.

15. The non-transitory computer-readable medium of claim 13, wherein the instructions cause the one or more processors to:

calculate covariances for each navigation sub-solution;

calculate covariances for separations between each navigation sub-solution and the full navigation solution; and calculate the protection level based on the covariances for each navigation sub-solution and the covariances for the separations between each navigation sub-solution and the full navigation solution.

16. The non-transitory computer-readable medium of claim 13, wherein the instructions cause the one or more processors to:

calculate covariances for each navigation sub-solution;

calculate covariances for separations between each navigation sub-solution and the full navigation solution;

calculate the protection level based on the covariances for each navigation sub-solution and the covariances for the separations between each navigation sub-solution and the full navigation solution;

calculate a set of test statistics based on the separations between each navigation sub-solution and the full navigation solution; and detect a fault by comparing the set of test statistics with a pre-defined threshold.

17. The non-transitory computer-readable medium of claim 13, wherein the instructions cause the one or more processors to:

determine whether a subset of the plurality of subsets includes a fault based on whether a difference between a navigation sub-solution that is calculated with the subset excluded and the full navigation solution is greater than a threshold.

\* \* \* \* \*